(12) United States Patent
Brewis et al.

(10) Patent No.: US 8,589,878 B2
(45) Date of Patent: Nov. 19, 2013

(54) HEURISTICS FOR DETERMINING SOURCE CODE OWNERSHIP

(75) Inventors: Deon C. Brewis, Redmond, WA (US); Jean-Pierre Duplessis, Redmond, WA (US); Matthew S. Johnson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1322 days.

(21) Appl. No.: 11/975,784

(22) Filed: Oct. 22, 2007

(65) Prior Publication Data

US 2009/0106736 A1   Apr. 23, 2009

(51) Int. Cl.
*G06F 9/44* (2006.01)

(52) U.S. Cl.
USPC ........................................................ 717/123

(58) Field of Classification Search
None
See application file for complete search history.

(56) References Cited

U.S. PATENT DOCUMENTS

| | | | |
|---|---|---|---|
| 4,751,635 A * | 6/1988 | Kret ..................................... | 1/1 |
| 6,393,421 B1 | 5/2002 | Paglin | |
| 6,536,037 B1 | 3/2003 | Guheen et al. | |
| 6,983,446 B2 * | 1/2006 | Charisius et al. ............. | 717/113 |
| 7,464,371 B2 * | 12/2008 | Jenkins .......................... | 717/123 |
| 7,769,787 B2 * | 8/2010 | Hailpern et al. .............. | 707/803 |
| 2002/0140699 A1 * | 10/2002 | Miyadai ......................... | 345/440 |
| 2003/0192029 A1 * | 10/2003 | Hughes .......................... | 717/101 |
| 2004/0068713 A1 * | 4/2004 | Yannakoyorgos et al. ... | 717/101 |
| 2004/0153994 A1 * | 8/2004 | Bates et al. ................... | 717/110 |
| 2004/0230508 A1 * | 11/2004 | Minnis et al. .................... | 705/35 |
| 2005/0086233 A1 * | 4/2005 | Jenkins ......................... | 707/100 |
| 2005/0114829 A1 | 5/2005 | Robin et al. | |
| 2005/0192957 A1 * | 9/2005 | Newbold .......................... | 707/5 |
| 2006/0059455 A1 * | 3/2006 | Roth et al. .................... | 717/103 |
| 2006/0106821 A1 * | 5/2006 | Cox et al. ...................... | 707/100 |
| 2006/0212857 A1 * | 9/2006 | Neumann et al. ............. | 717/140 |
| 2007/0166684 A1 * | 7/2007 | Walker .......................... | 434/322 |
| 2007/0250816 A1 * | 10/2007 | Rose .............................. | 717/124 |
| 2007/0299825 A1 * | 12/2007 | Rush et al. ....................... | 707/3 |
| 2008/0086718 A1 * | 4/2008 | Bostick et al. ................ | 717/120 |
| 2008/0098344 A1 * | 4/2008 | Piatt .............................. | 717/101 |
| 2008/0320457 A1 * | 12/2008 | King et al. .................... | 717/146 |
| 2009/0070734 A1 * | 3/2009 | Dixon et al. .................. | 717/102 |
| 2009/0138843 A1 * | 5/2009 | Hinton et al. ................. | 717/101 |

OTHER PUBLICATIONS

Armour, P.G., "The Business of Software", 2004.*
Kilgour et al, "A Fuzzy Logic Approach to Computer Software Source Code Authorship Analysis", 1997.*

(Continued)

*Primary Examiner* — Lewis A Bullock, Jr.
*Assistant Examiner* — Christine Dang

(57) ABSTRACT

Various technologies and techniques are disclosed for using heuristics to determine source code ownership. A request is received to identify at least one owner of a particular source code unit. Initial ownership totals are calculated for the source code unit based upon a code contribution heuristic. The code contribution heuristic counts lines of code that were added and that were modified in the totals for contributing users. The initial ownership totals of the particular source code unit are adjusted based upon at least one other heuristic. The at least one owner of the particular source code unit is then output to an output device. The at least one owner is determined by selecting a contributing user that has a highest ranking total after adjusting the initial ownership totals. For example, there can be a primary owner and a backup owner selected based on the ranking of the ownership totals.

11 Claims, 17 Drawing Sheets

(56) References Cited

OTHER PUBLICATIONS

Rishab, et al; "Free/Libre and Open Source Software: Survey and Study FLOSS" pp. 1-21, Netherlands, 2002.
O'Callaghan A.J,"Focus Issue on Legacy Information Systems and Business Process Change" pp. 1-43, Leicester, UK, 1999.
Greevy Orla, et al, "How Developers Develop Features" pp. 1-10, France, 2007.
David, P. A., "Linux: Chronology of the Kernel Sources (LICKS): The Economic Organization and Viability of Open Source Software", as retrieved from http://siepr.stanford.edu/programs/OpenSoftware_David/Licks4b_prop.htm on Jul. 10, 2007, 7 pages.

* cited by examiner

```
// 12 lines - Joe – August 2006
CCabEntry::CCabEntry()
{ [PORTIONS OMITTED] }

CCabEntry::CCabEntry(LPVOID cabEntryLocation, CCabFile * const headerLocation, int    entryNumber)
{ [PORTIONS OMITTED] }

// 20 lines - Jane – June 2005
CCabEntry::~CCabEntry(void)
{
} bool CCabEntry::IsEmpty() const
{return (m_cabEntry == NULL);}
    [PORTIONS OMITTED]

// 15 lines – Peter – January 2007
DWORD CCabRntry::GetFileTime() const
{
    [PORTIONS OMITTED]
}
```

FIG. 5

```
// 12 lines  - Lab integrating from other branches - August 2006
CCabEntry::CCabEntry()
{
    m_entryNumber = 0;
    m_cabEntry    = NULL;
    m_cabFile     = NULL;
}

CCabEntry::CCabEntry(LPVOID cabEntryLocation, CCabFile * const  headerLocation,B entryNumber)
{
    m_entryNumber = entryNumber;
    m_cabEntry    = reinterpret_cast<CCABENTRY * const>(cabEntryLocation);
    m_cabFile     = headerLocation;
}
```

```
// 6 lines - Joe - August 2006
CCabEntry::CCabEntry()
{
    m_entryNumber = 0;
    m_cabEntry    = NULL;
    m_cabFile     = NULL;
}
```

```
// 6 lines - Jeff - August 2006
CCabEntry::CCabEntry(LPVOID cabEntryLocation, CCabFile * const headerLocation, int entryNumber)
{
    m_entryNumber = entryNumber;
    m_cabEntry    = reinterpret_cast<CCABENTRY * const>(cabEntryLocation);
    m_cabFile     = headerLocation;
}
```

390, 392, 394

HEURISTICS FOR DETERMINING SOURCE CODE OWNERSHIP

BACKGROUND

Software developers create software applications using one or more software development programs. These software development programs allow developers to create the underlying source code that contains the logic for implementing the desired functionality for a given software application under development. Source code files may themselves contain certain data about who created the file, such as in a code comment where each developer makes a comment to explain what changes he/she made to the code. Parsing these comments programmatically to obtain meaningful ownership information can be difficult, because interpretation of the comment is required. Some software development programs allow users to manually specify an "owner" of a particular project or other source code unit in a software application under development. This approach requires manual updates as ownership changes. Many file systems (independently of software development programs) are able to track who created a given file and/or who updated a given file most recently. This creation and/or update information may or may not have anything to do with who is the owner of the contents of a given file, and does not contain the details of exactly which lines were modified.

In the world of software development, most companies have to rely on internal company knowledge about who really owns a specific source code unit. When a question does arise that involves a specific unit of code, the person wanting to speak with the current source code owner basically has to just use this internal company knowledge to try and guess who the owner is, or to consult manually assigned ownership information that may be out of date, if such manually assigned ownership information is even available. One reason that an owner of a source code unit may need to be contacted is because the particular source code unit broke the build (compilation) of the software application. Another reason that an owner of a particular source code unit may need to be contacted is because changes need to be made to the software application that will impact the particular unit of code.

SUMMARY

Various technologies and techniques are disclosed for using heuristics to determine source code ownership. A request is received to identify at least one owner of a particular source code unit. Initial ownership totals are calculated for the source code unit based upon a code contribution heuristic. In one implementation, a code contribution heuristic counts the lines of code that were added and that were modified by a respective contributing user to arrive at the initial ownership totals for each respective contributing user. The initial ownership totals of the particular source code unit are then adjusted based upon at least one other heuristic. The at least one owner of the particular source code unit is then output to an output device, such as a display. The at least one owner is determined by selecting a contributing user that has a highest ranking total after adjusting the initial ownership totals.

In one implementation, a method for determining primary and backup owners of source code units is provided. Lines of code that were added in a particular source code unit are counted in the totals for each contributing user. Lines of code that were modified in the particular source code unit are counted in the totals for each contributing user. Ownership percentages are calculated for each contributing user based upon a total count of the added lines of code and the modified lines of code made by each contributing user. A primary owner of the particular source code unit is then identified by selecting a highest ranking contributing user from the ownership percentages. A backup owner of the particular source code unit is identified by selecting a second highest ranking contributing user from the ownership percentages.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 illustrates how exemplary source code in the same source code file is counted during a code contribution process as code contributions by different contributing users.

Figure 1:
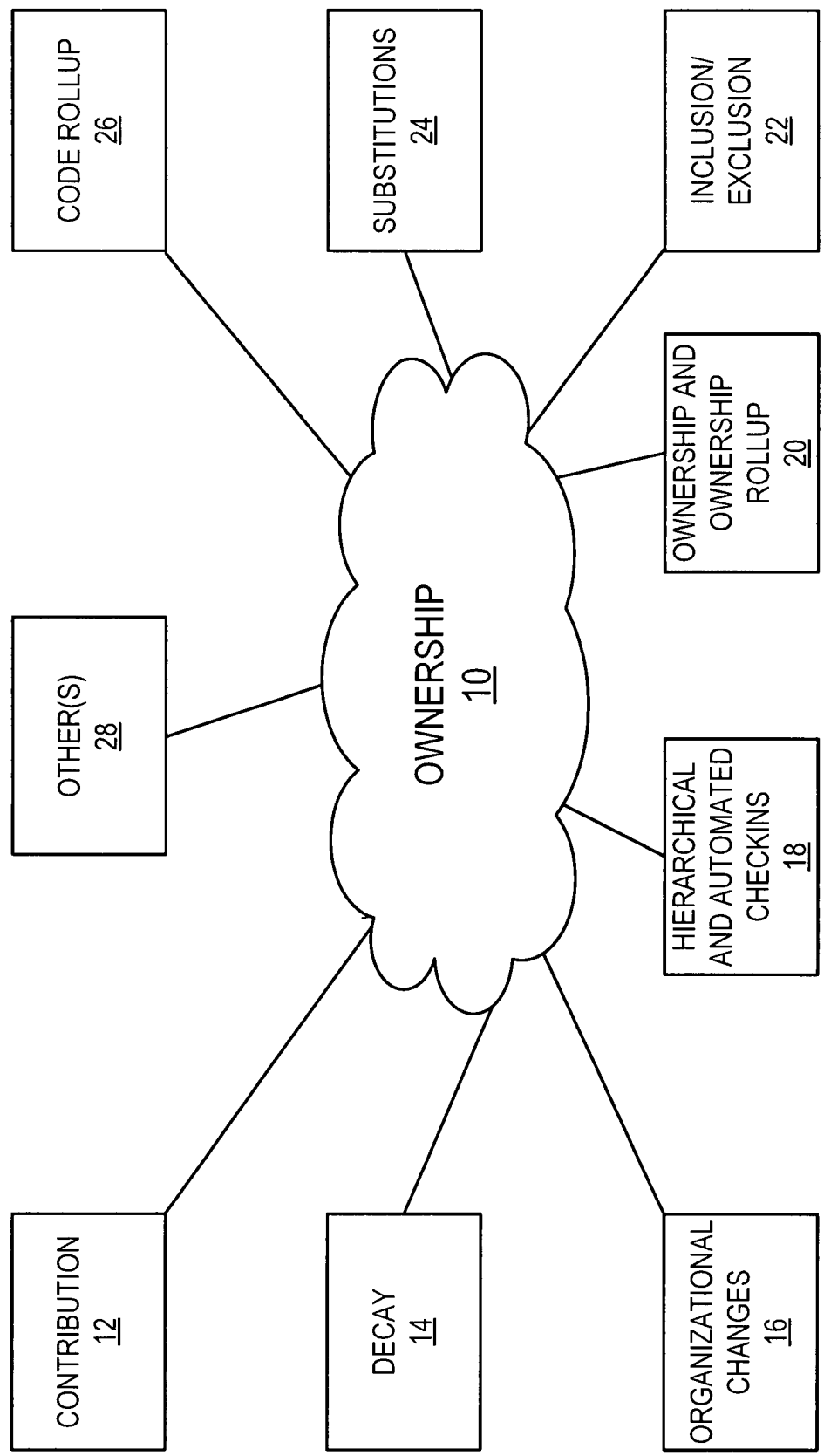
FIG. 1 is a diagrammatic view of exemplary source code ownership heuristics that can be used for determining ownership of source code.

is a process flow diagram for one implementation of the system of FIG. 1 that illustrates the stages involved in using hierarchical and automated checkins as a heuristic in determining/adjusting source code ownership.

FIG. 9 illustrates some exemplary source code that was checked in by a lab computer that integrated source code from other branches.

FIG. 10 illustrates an exemplary source code branch that shows how the exemplary source code from FIG. 9 looked before the lab checkin.

Figure 11:
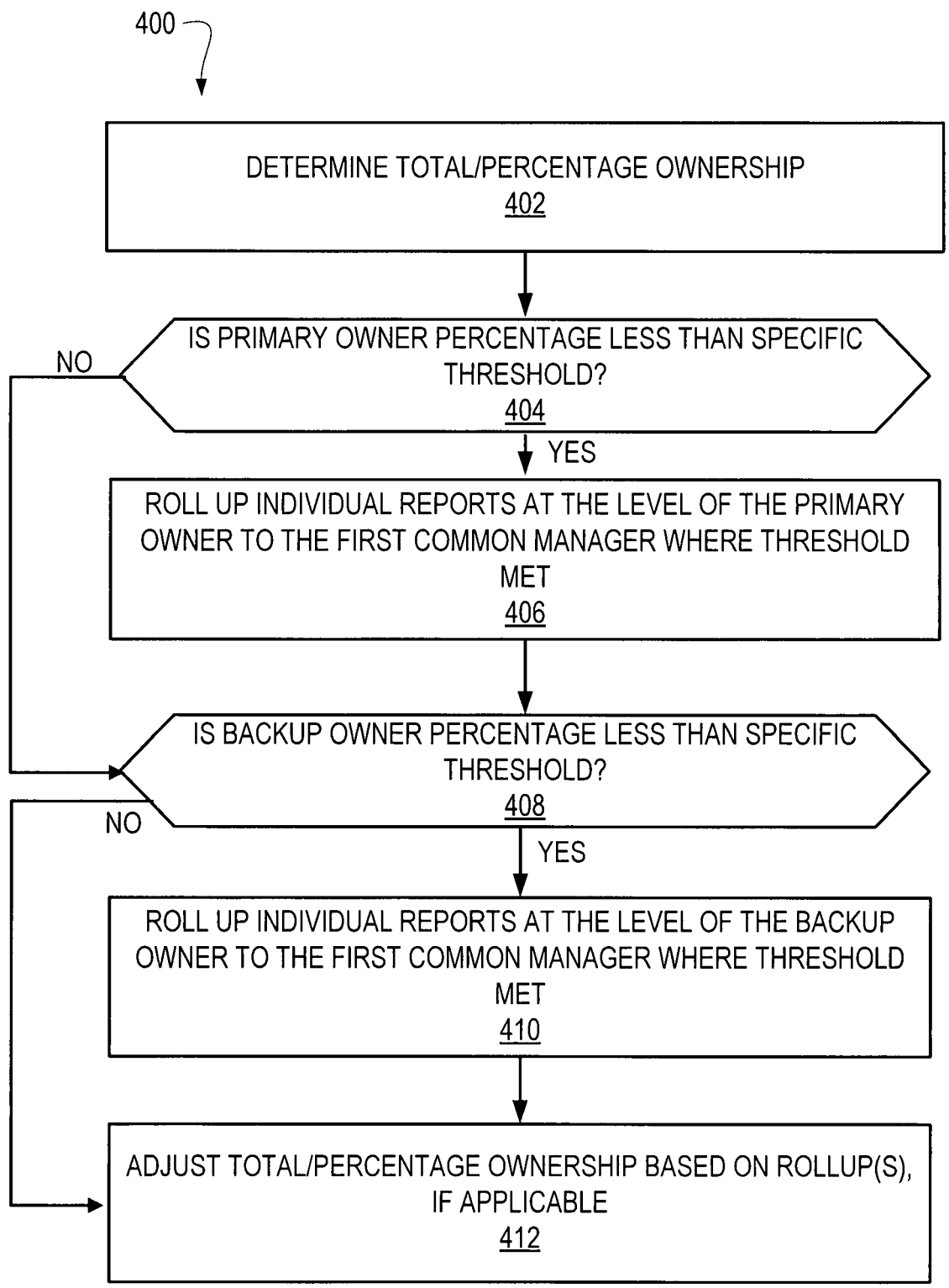

FIG. 11 is a process flow diagram for one implementation of the system of FIG. 1 that illustrates the stages involved in using ownership and ownership rollup as a heuristic in determining/adjusting source code ownership.

Figure 12:
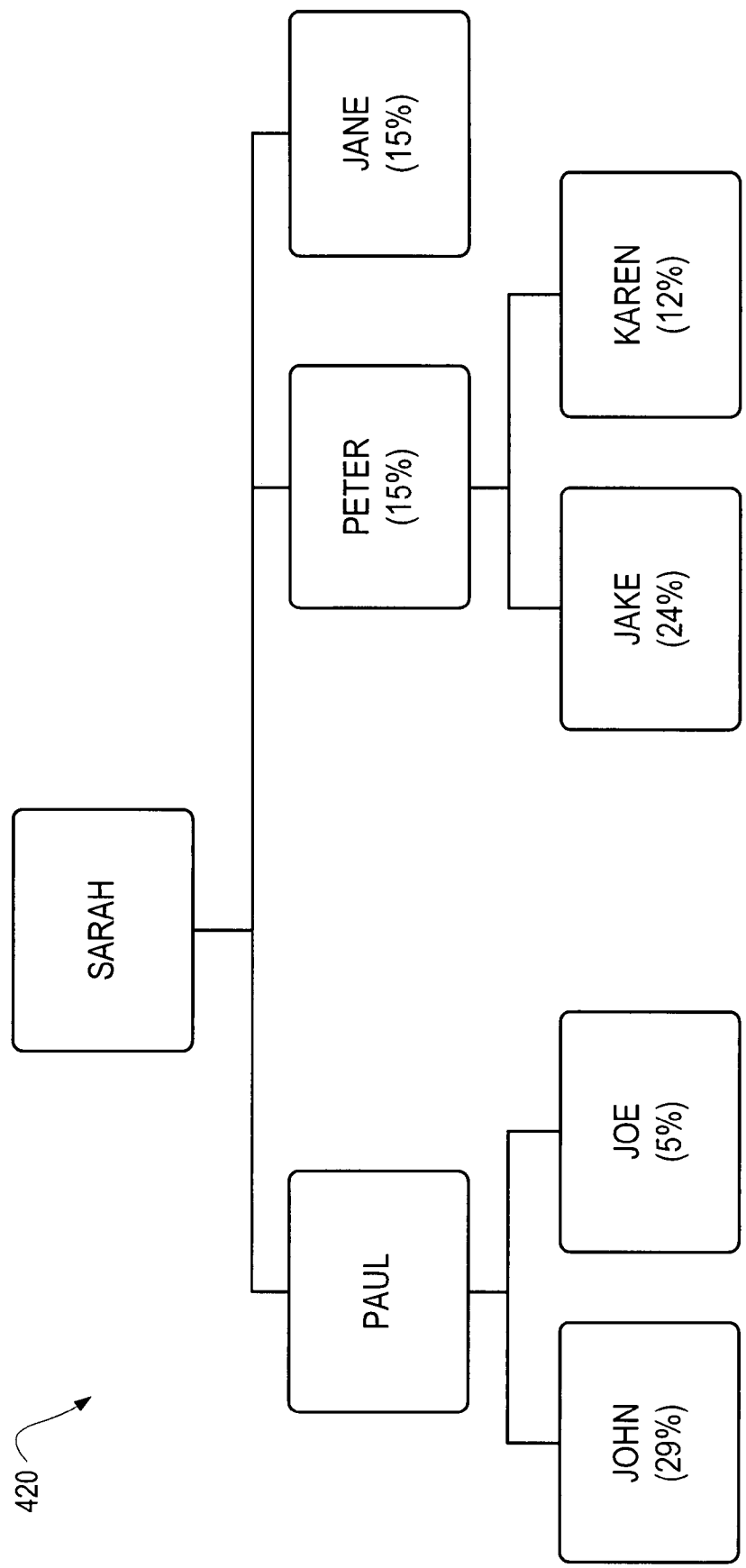

FIG. 12 is a diagrammatic view of an organizational structure that shows ownership percentages of a particular source code unit before performing an ownership rollup process described in FIG. 11.

Figure 13:
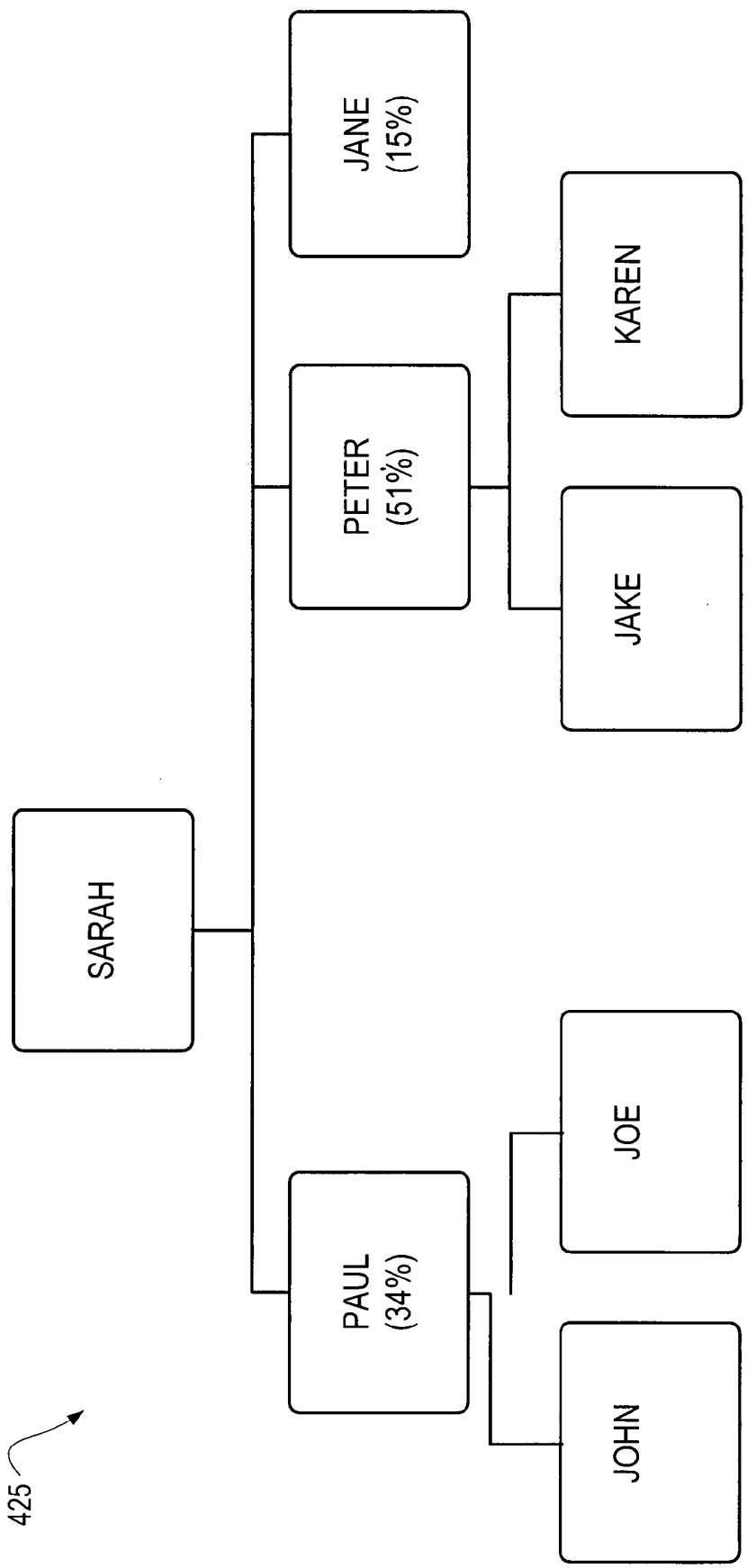

FIG. 13 is a diagrammatic view of an organizational structure that shows ownership percentages of a particular source code unit after performing an ownership rollup process described in FIG. 11 based on the organizational structure of FIG. 12.

Figure 14:
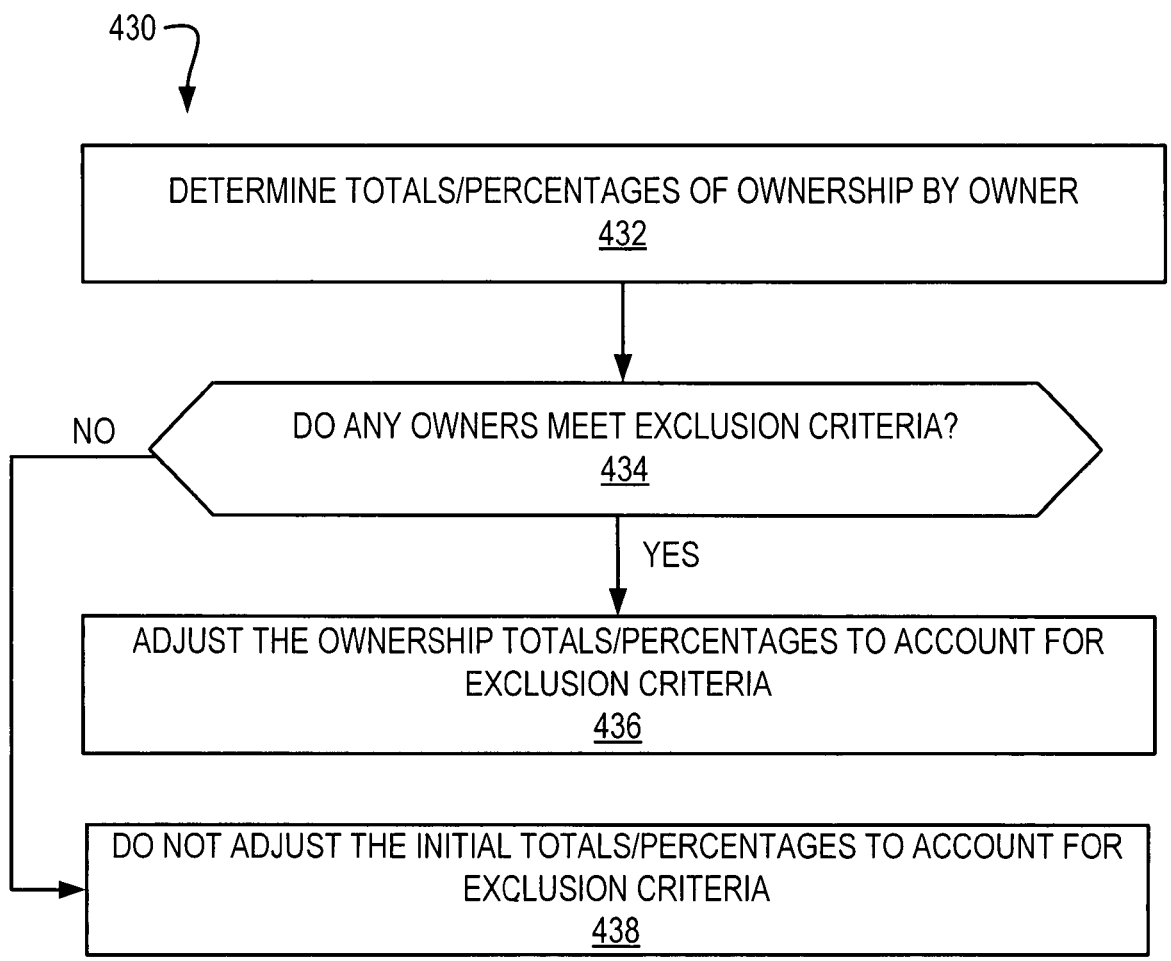

FIG. 14 is a process flow diagram for one implementation that illustrates the stages involved in using inclusion/exclusion lists as a heuristic in determining/adjusting source code.

Figure 15:
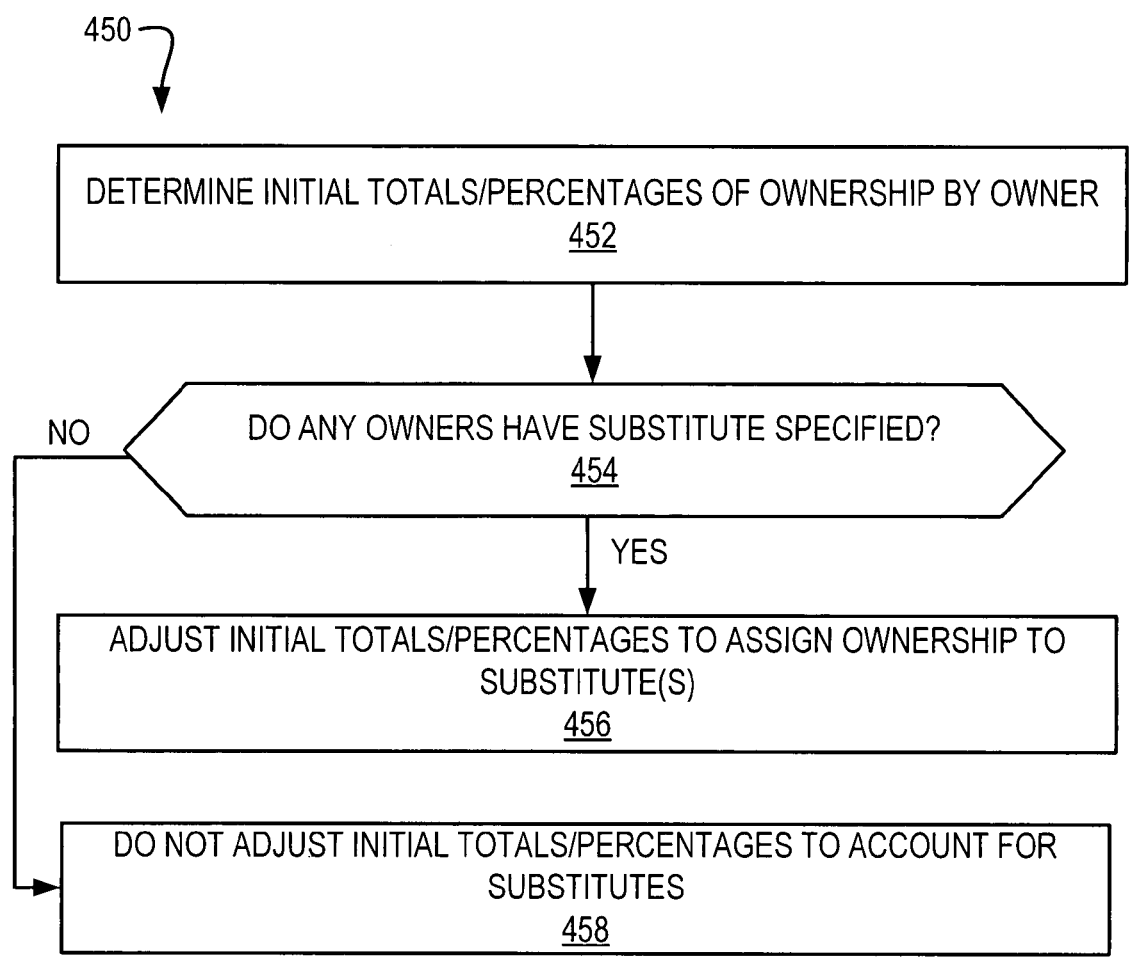

FIG. 15 is a process flow diagram for one implementation that illustrates the stages involved in using substitutions as a heuristic in determining/adjusting source code ownership.

Figure 16:
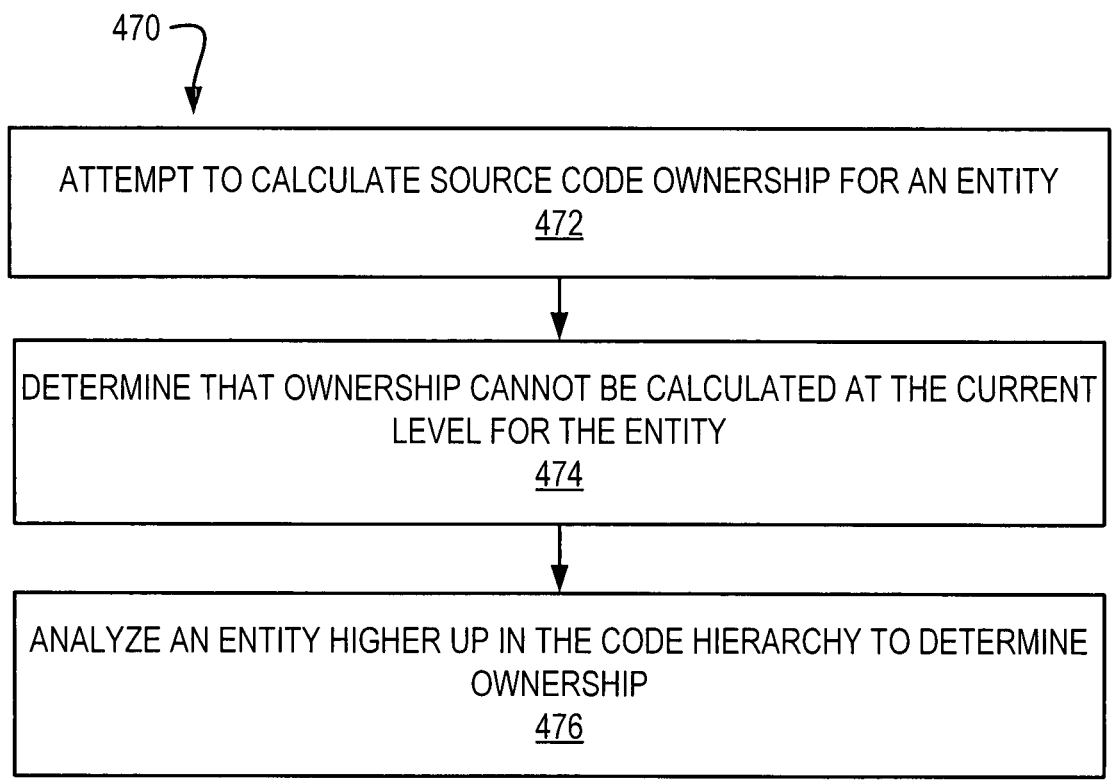

FIG. 16 is a process flow diagram for one implementation that illustrates the stages involved in using code rollup as a heuristic in determining/adjusting source code ownership.

Figure 17:
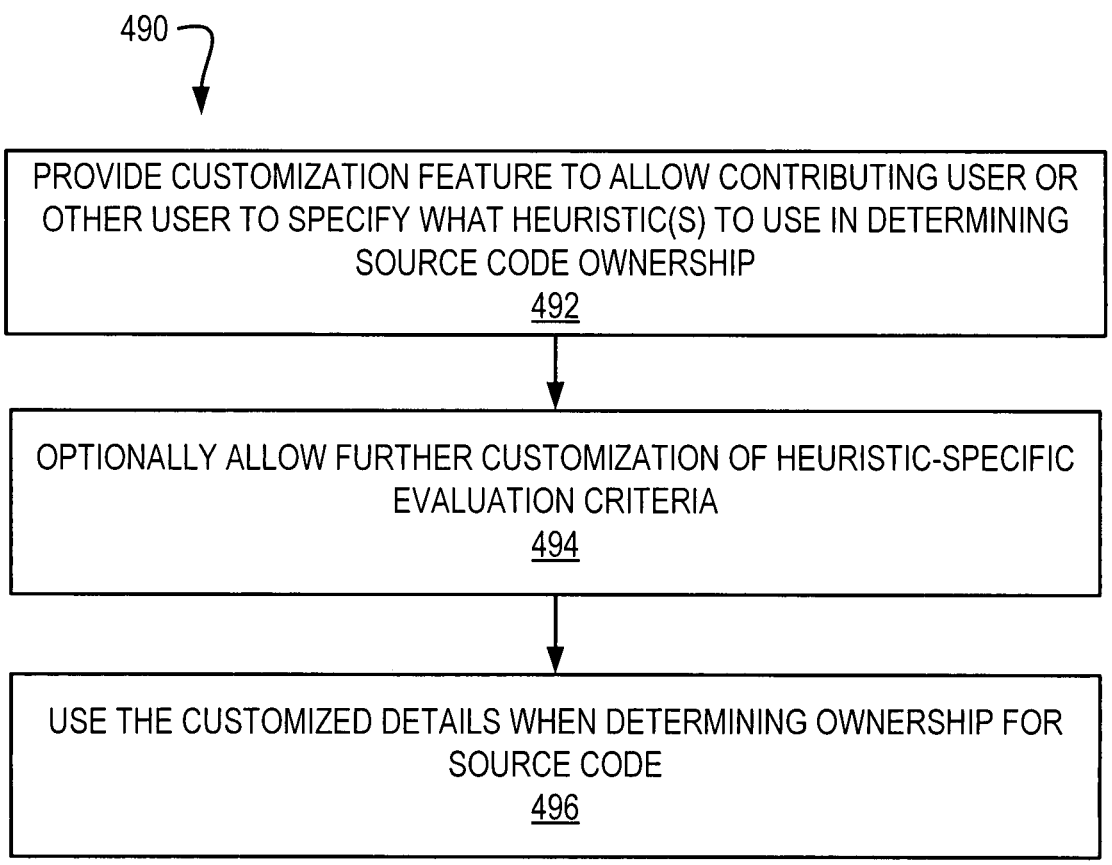

FIG. 17 is a process flow diagram for one implementation that illustrates the stages involved in providing a customization feature to allow a user to customize the heuristics used in determining source code ownership.

DETAILED DESCRIPTION

The technologies and techniques herein may be described in the general context as an application that heuristically determines the owner of one or more source code units, but the technologies and techniques also serve other purposes in addition to these. In one implementation, one or more of the techniques described herein can be implemented as features within a software development program such as MICROSOFT® VISUAL STUDIO®, from a software version control program, or from any other type of program or service that interacts with source code units. The term "source code unit" as used herein is meant to include a discrete region of source code or other information, which can be a single character, a line, multiple lines, a file, a folder, a project, or any other range of source code or information within one or more files that can be measured as discrete regions. For example, source code can include information that is contained in one or more source code files, XML files, HTML files, etc.

In one implementation, a system is provided that uses heuristics to determine who the owner is of a given source code unit. The term "heuristic" as used herein is meant to include program logic that is used to analyze a source code unit according to one or more rules. A code contribution heuristic is used to calculate the initial ownership totals for each contributing user. Additional heuristics can then be used to further adjust the initial ownership totals to arrive at the final ownership totals that are then ranked to determine the owner(s) of the source code.

FIG. 1 is a diagrammatic view of exemplary heuristics that can be used for determining ownership of source code. In some implementations, some, all, and/or additional heuristics than those shown in FIG. 1 are at least partially implemented in the operating logic of computing device 100 (of FIG. 2). Nine example heuristics are shown, including a contribution heuristic 12, decay heuristic 14, organizational changes heuristic 16, hierarchical and automated checkin heuristic 18, ownership and ownership rollup heuristic 20, inclusion/exclusion heuristic 22, substitution heuristic 24, code rollup heuristic 26, and other(s) heuristics 28. Each of these heuristics will now be described in further detail.

The contribution heuristic 12 ranks the amount of code that is contributed by a given user, called the "contributing user". The term "contributing user" as used herein is meant to include the one who made the actual contribution, or one who is assigned with the contribution through a manual or automated process. In one implementation, a line that is added or modified by a given user is counted as a contribution to a block of code when determining ownership of source code. In one implementation, a line that has been deleted is not counted as a contribution, although in other implementations, deleted lines can be counted. The contribution heuristic is described in further detail in FIGS. 4 and 5. The decay heuristic 14 weights code that has been checked in more recently with a stronger weight than code that is older when determining ownership of source code. The decay heuristic 14 is described in further detail in FIG. 6. The organizational changes heuristic 16 considers changes in organizational structure when determining ownership of source code. The organizational changes heuristic 16 is described in further detail in FIG. 7.

Continuing with the hierarchical and automated checkin heuristic 18, when source code systems span multiple branches of source code, and code moves up and down in a branch, there can be entities who check in code that do not really contribute to the code. Thus, the automated checkin heuristic 18 considers these hierarchical and automated checkins when determining ownership of source code, as described in further detail in FIGS. 8-10. The ownership and ownership rollup heuristic 20 is responsible for aggregating ownership totals to a common manager when a specific ownership threshold is not met when determining ownership of source code. The ownership and ownership rollup heuristic 20 is described in further detail in FIGS. 11-13. The inclusion/exclusion heuristic 22 takes into consideration that certain individuals may have roles or other characteristics that are not typical of an owner of a source code unit. The inclusion/exclusion heuristic 22 is described in further detail in FIG. 14. The substitution heuristic 24 is responsible for substituting the ownership totals of one contributing user with another contributing user at the proper times, as described in further detail in FIG. 15. The code rollup heuristic 26 is responsible for rolling up source code units into higher units when sufficient information does not exist at an initial level to make an ownership determination. The code rollup-heuristic 26 is described in further detail in FIG. 16.

With this as background, an exemplary computing environment will be described next, followed by the more detailed discussion of how these various heuristics can be used separately and/or in combination with one another to determine source code ownership.

Figure 2:
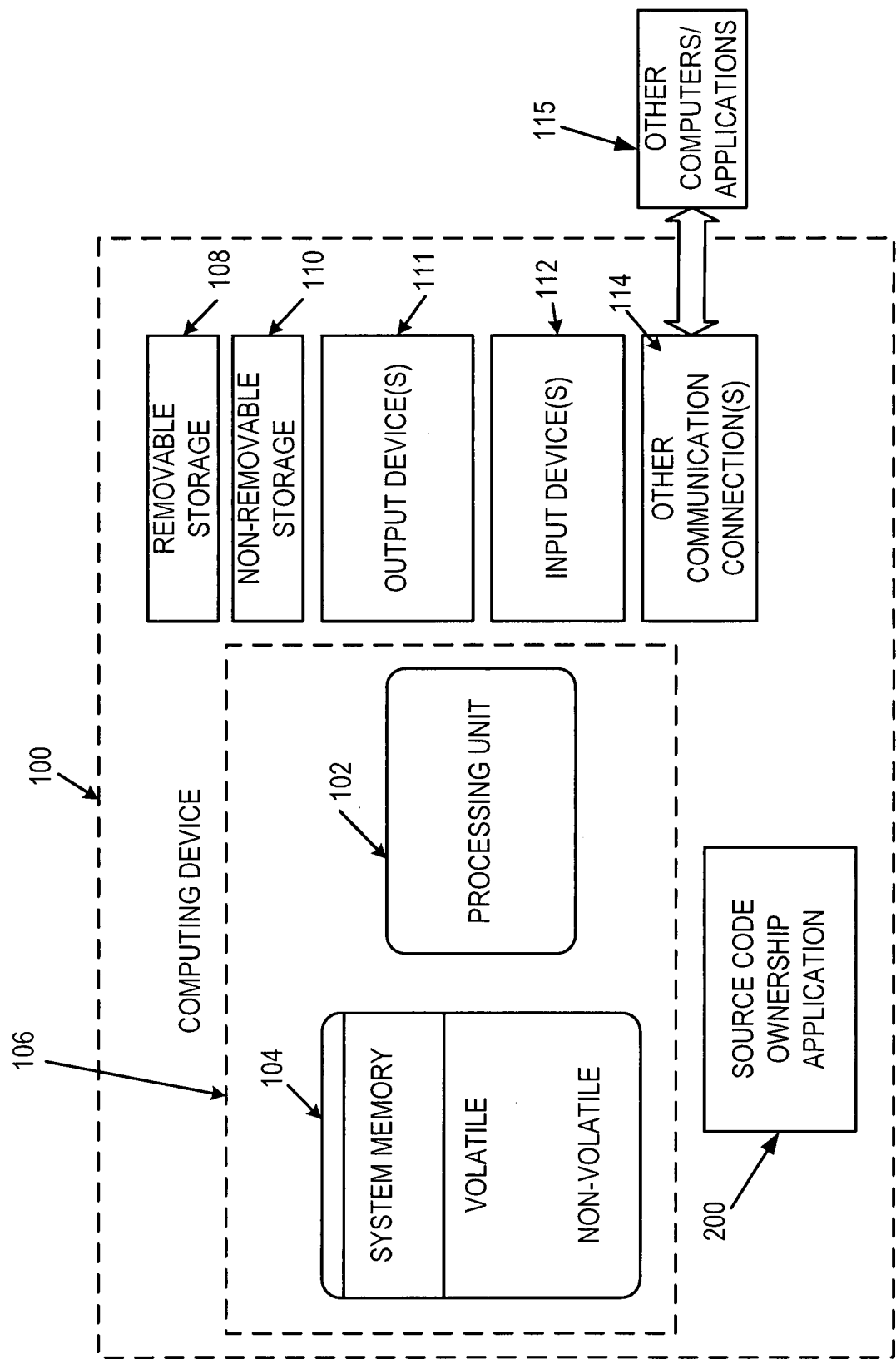
FIG. 2 is a diagrammatic view of a computer system of one implementation.

As shown in FIG. 2, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 2 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes source code ownership application 200, which can include some, fewer, and/or additional heuristics for determining source code ownership than those shown and discussed in FIG. 1.

Figure 3:
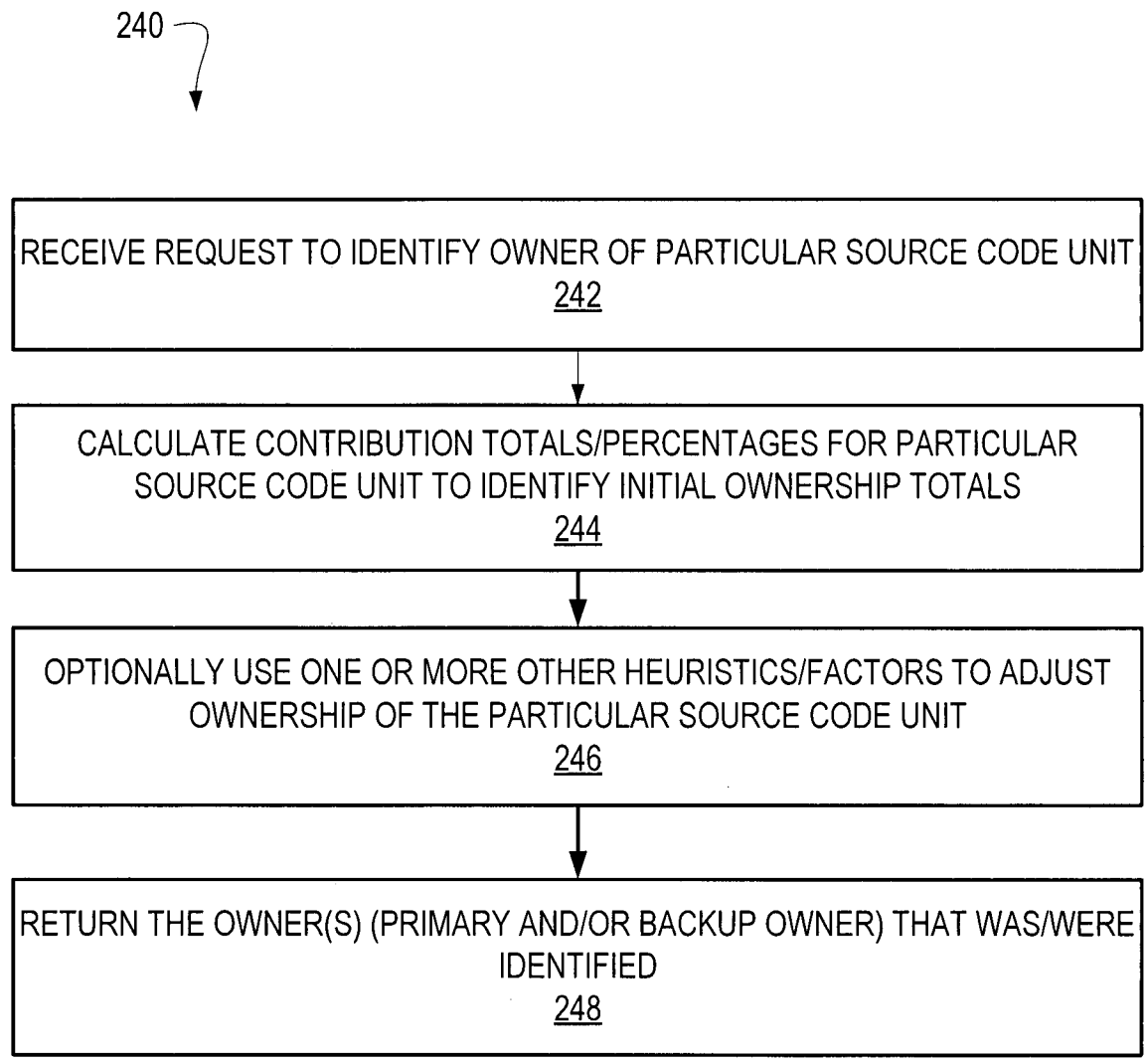
FIG. 3 is a process flow diagram for one implementation illustrating the high level stages involved in identifying and displaying the owner of a particular source code unit.

Turning now to FIGS. 3-17 with continued reference to FIGS. 1-2, the stages for implementing one or more implementations of source code ownership application 200 are described in further detail. In some implementations, the processes of FIGS. 3-17 are at least partially implemented in the operating logic of computing device 100. FIG. 3 is a process flow diagram 240 that illustrates one implementation of the high level stages involved in identifying and displaying the owner of source code that has been determined using heuristics. The system receives a request to identify the owner of a particular source code unit (stage 242), such as upon a user selection of an option to identify the owner of the particular source code unit, or from a programmatic request to determine ownership. The contribution heuristic is used to calculate contribution totals and/or percentages for the particular source code unit to identify the initial ownership totals (stage 244), as described in further detail in FIGS. 4 and 5. One or more other heuristics/factors (such as those described in FIG. 6-16) can be used to adjust the ownership determination of the particular source code unit as desired (stage 246). The source code owner(s) that was/were identified during the ownership determination process are then returned, such as for output or displayed on a display device, or for use by another application (stage 248). In one implementation, both a primary and a backup owner that were identified as having the highest ownership totals after any adjustments were made to the totals are output/displayed. In another implementation, only one owner that had the highest ownership total after any adjustments is returned. In yet another implementation, a complete list can be returned. Other variations are also possible.

Figure 4:
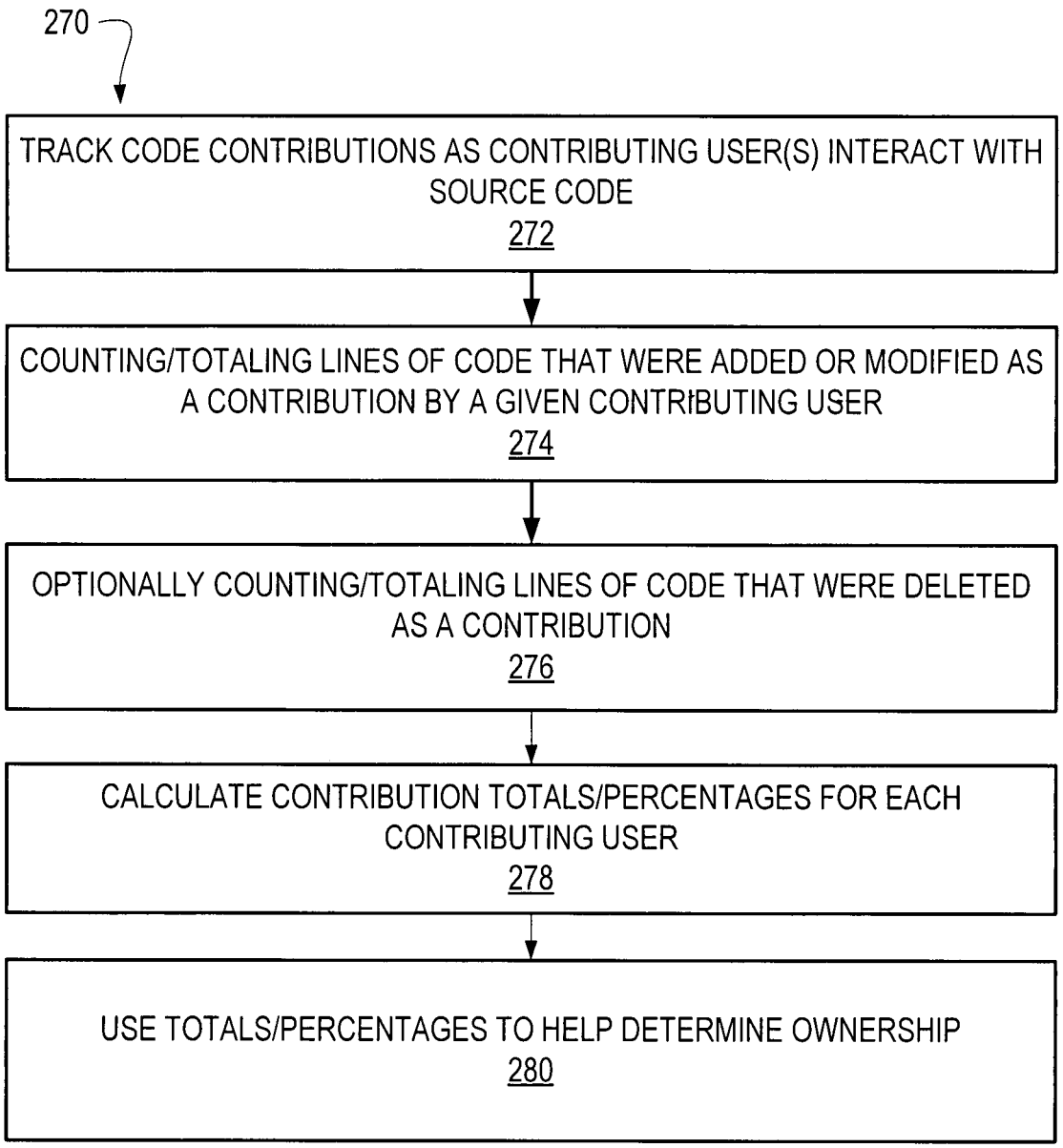
FIG. 4 is a process flow diagram for one implementation illustrating the stages involved in using code contributions as a heuristic in determining source code ownership.

FIG. 4 is a process flow diagram 270 that illustrates one implementation of the stages involved in using code contributions as a heuristic in determining source code ownership. The system tracks code contributions (additions, modifications, and optionally deletions) as contributing user(s) interact with the source code (stage 272), such as from within a software development program. The lines of code that were added or modified are counted/totaled as a contribution by a given contributing user (stage 274). In one implementation, certain lines of code can be counted more than other lines of code, such as opening brackets and/or comments counting less than standard lines of code, and so on.

In one implementation, when one contributing user added the line and one or more other contributing users have modified the same line, heuristics are used to determine which contributing user should be counted as the owner of that line. For example, suppose contributing user Bob adds a single new line that has 28 characters. Bob is the initial owner of that line. Suppose that John then comes along and modifies the line to add 13 new characters. In one implementation, John could be counted as the owner since John revised the line of code most recently. In another implementation, Bob could be counted as the owner since Bob contributed more characters. In yet another implementation, the nature of the changes that John made versus Bob can be analyzed to determine which contributing user made more changes of substance than the other (such as actual code versus just a comment). These are just a few non-limiting examples of the types of heuristics that can be used to determine who is an owner of a given line when multiple contributing users have added and/or modified the same line. The information about who added and/or who modified the line can be a starting point for this determination.

In addition to counting the lines of additions and/or modifications by each contributing user as a contribution, the lines of code that were deleted can optionally be counted as a contribution (stage 276). In one implementation, deleted lines of code are not counted as a contribution, but in another implementation, they are counted as a contribution. In yet another implementation, a user defined setting can be specified to indicate whether lines of code that were deleted should be counted as a contribution or not. In such a scenario, if the user defined setting indicates that lines of code that were deleted should be counted as contributions, then these numbers are included in the totals.

Upon totaling up the lines of code that each contributing user has contributed to the particular source code unit (from stages 274 and optionally 276), the contribution totals and/or percentages for each contributing user are determined (stage 278). A hypothetical example of this is described momentarily in FIG. 5 to further illustrate the contribution heuristic. These totals/percentages can then be used as the initial ownership totals to help determine ownership of the source code unit (stage 280), such as in combination with one or more of the other heuristics described in FIGS. 6-16.

FIG. 5 illustrates how exemplary source code 286 in the same source code file is counted with a code contribution heuristic (described in FIG. 4) as code contributions by different contributing users. In the example shown, Joe contributed 12 lines of code, Jane contributed 20 lines of code, and Peter contributed 15 lines of code. From this information, the initial ownership totals reveal the following:

Jane: 42.5% or 20 of 47 lines
Peter 31.9% or 15 of 47 lines
Joe 25.6% or 12 of 47 lines Thus, Jane has the highest stake in the code, with Peter second, and Joe third. In this example, Jane would thus be the primary owner of the code, with Peter being second.

Turning now to FIGS. 6-16, different heuristics are described in detail that can be used in combination with the contribution heuristic described in FIGS. 4-5 to arrive at the final ownership totals. While the remaining heuristics are described in an order, this order is just for the sake of discussion. In other words, one or more of these heuristics can be used in combination with the code contribution heuristic described previously, and can be used in one of various orders.

Figure 6:
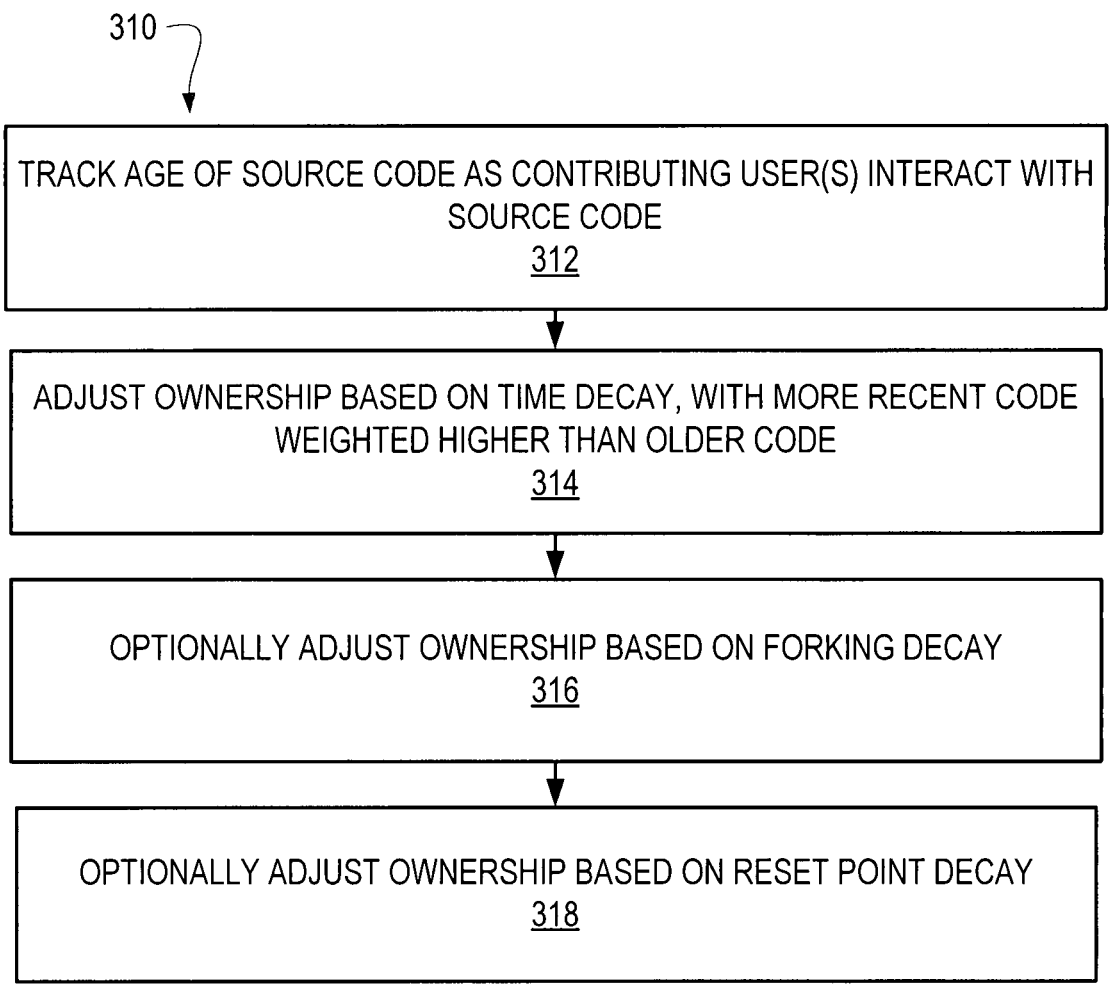
FIG. 6 is a process flow diagram for one implementation illustrating the stages involved in using code decay as a heuristic in determining/adjusting source code ownership.

Starting with FIG. 6, a process flow diagram 310 illustrates one implementation of the stages involved in using code decay as a heuristic in determining/adjusting source code ownership. The system tracks the age of the source code as contributing user(s) interact with the source code (stage 312), such as from within a software development program. The initial ownership totals can be adjusted based on the decay, with more recent code being weighted higher than older code (stage 314). For example, assume that the current date is May 2007 with the following facts (carried forward from the previous example):

Peter has a 31.9% (15 of 47 lines) stake in the code, and has code 4 months old
Joe has a 25.6% (12 of 47 lines) stake in the code, and has code 9 months old
Jane has a 42.5% (20 of 47 lines) stake in the code, and has code 23 months old The code decay heuristic can use a constant and a variable rate as part of the calculation (but other variations are also possible). For example, for the first 6 months, no decay may take place, and after that, decay can happen at a rate of 3% (or another %) per month. These values are just examples, and can be different depending on user defined settings, the stability of the organization, programmatically specified settings, etc. In the example above that uses the 6 month/3% formula:

Peter still has a 31.9% stake in the code
Joe has a 25.6% stake that decayed for 3 months; at 3% for 3 months=25.6%/(1.03^3)=23.43% stake remaining
Jane has a 42.5% stake that decayed for 24 months; at 3% for 24 months=42.5%/1.03^24)=20.91% stake remaining The new distribution total in the above example is 76.24% (31.9+23.43+20.91). Upon re-balancing the number as a % out of 100 (instead of 76.24), the new allocations after accounting for the decay are:

Peter: 41.84%
Joe: 30.73%
Jane: 27.43%

In this example, Joe's contribution overtook Jane's contribution due to the decay, even though Jane originally contributed more lines of code. However, Joe has worked on the code more recently, and is thus more likely to know the code. After adjusting the ownership totals for the decay, Peter is the primary owner of the file, and Joe is the backup owner.

In one implementation, the ownership of code is adjusted based on the forking decay (stage 316) instead of or in addition to time decay. Forking decay involves weighting code that was contributed by those working on the new code more than code that was contributed by those who wrote a shared library that is used in multiple branches. In one implementation, the ownership of code is adjusted based upon reset point decay (stage 318) instead of or in addition to time decay and/or forking decay. Reset point decay involves assigning a different (such as a higher) percentage of decay after a reset point has been set than before a reset point was set. A reset point could be based upon a project milestone, company reorganization, etc.

Figure 7:
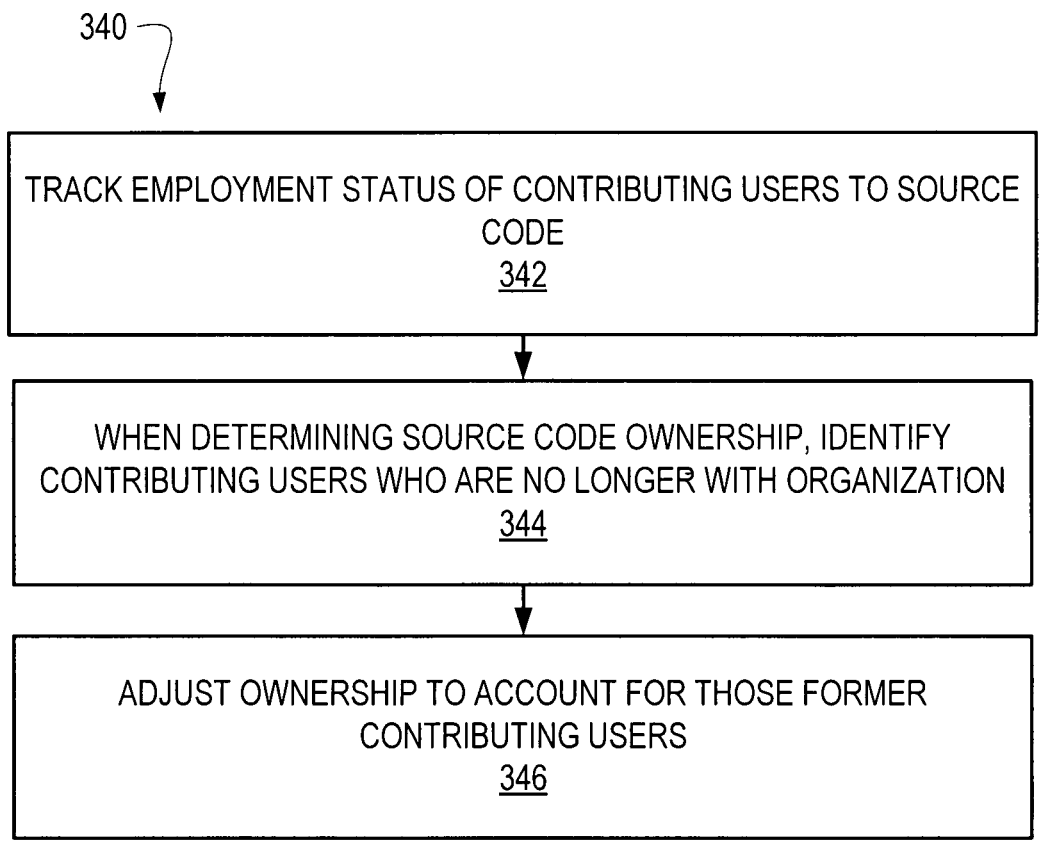
FIG. 7 is a process flow diagram for one implementation that illustrates the stages involved in using organizational changes as a heuristic in determining/adjusting source code ownership.

Turning now to FIG. 7, a process flow diagram 340 is shown that illustrates one implementation of the stages involved in using organizational changes as a heuristic in determining/adjusting source code ownership. The employment status of contributing users who contributed to the source code is tracked (stage 342), such as upon accessing a central database containing personnel records. When determining source code ownership, contributing users who are no longer with the organization and/or are no longer working on the source code unit are identified (stage 344). The ownership totals can be adjusted to account for the former contributing user(s) (stage 346). The adjustment to ownership totals to account for the former contributing user(s) can be performed in one of a variety of ways. As some non-limiting examples, the code contributed by the former contributing user can be totally ignored in the ownership totals, the totals can be remapped to someone else, the totals can be re-balanced among the remaining contributing users, the totals can be rolled up to a manager, or a proxy contributing user can be assigned to all contributing users who have left the organization.

Figure 8:
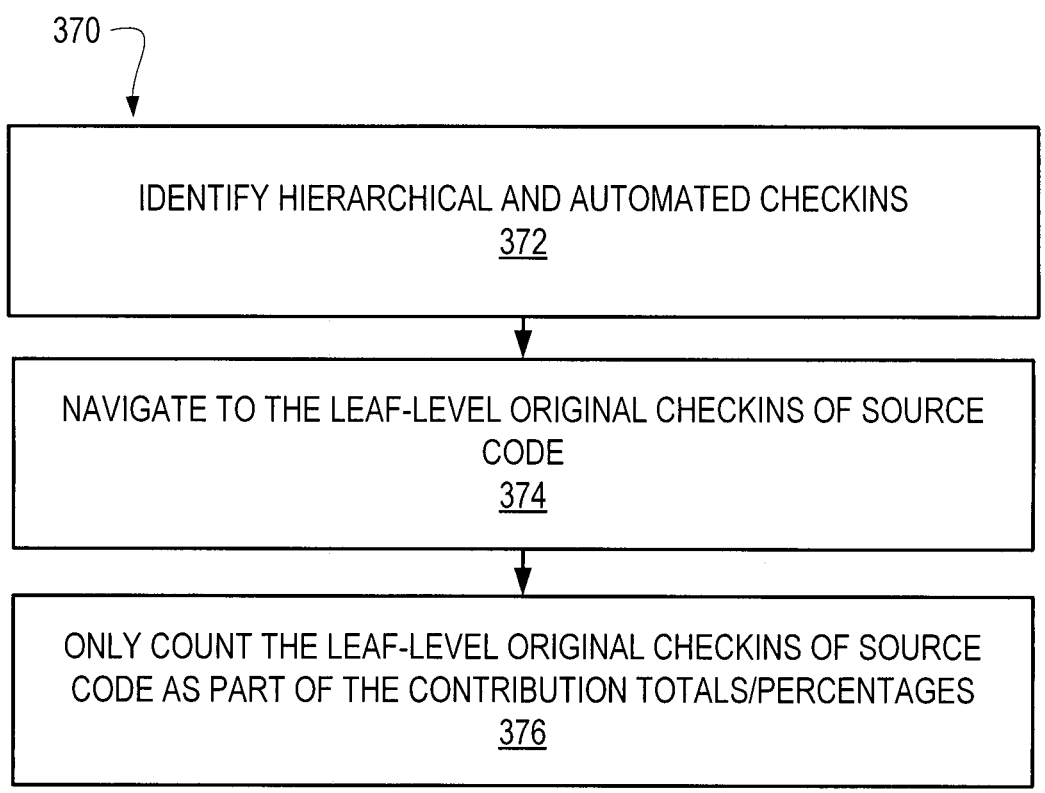

Turning now to FIG. 8, a process flow diagram 370 is shown that illustrates one implementation of the stages involved in using hierarchical and automated checkins as a heuristic in determining/adjusting source code ownership. The system identifies the hierarchical and automated checkins (stage 372), which involve situations where the source code spans multiple branches, with code moving up and down in a branch. In such situations, there can be users checking in source code that did not really contribute to the code. Thus, in such scenarios, the system can navigate to the leaf-level original checkins of the source code (stage 374), which is the level above the automated checkin. Then, only the source code at the leaf-level of the original checkins are counted as part of the contribution totals/percentages (stage 376), instead of the child level that gave a false identification of contributing users. FIG. 9 provides an illustrative example of this concept.

FIG. 9 shows some exemplary source code 380 that was checked in by a lab computer that integrated source code from other branches. Upon determining that the source code 380 was part of an automated checkin process, the system navigates to the leaf-level original checkin of the source code, which is illustrated for this example as FIG. 10. The example in FIG. 10 shows an exemplary source code branch 390 of how the exemplary source code from FIG. 9 looked before the lab checkin, which in this case, included 6 lines by Joe (392), and 6 lines by Jeff (394). The ownership totals can then be adjusted based upon the consideration of the source code at the leaf-level, instead of the source code at the higher level from the automated check-in.

As shown in FIG. 11, a process flow diagram 400 of one implementation illustrates the stages involved in using ownership and ownership rollup as a heuristic in determining/adjusting source code ownership. In one implementation, the system has access to an organizational structure in order to perform this ownership rollup heuristic. After performing one or more heuristics described herein, the system determines the total/percentage of ownership (stage 402) by each contributing user. If the percentage ownership of the primary owner is less than a specific threshold (decision point 404), then the individual reports at the level of the primary owner are rolled up to the first common manager where the threshold is actually met (stage 406). After the rollup (stage 406), or, in the situation where the percentage ownership of the primary owner is greater than a specific threshold (decision point 404), then the threshold for the backup owner is checked (as described next).

If the percentage ownership of the backup owner is less than the specific threshold (decision point 408), then the individual reports at the level of the backup owner are rolled up to the first common manager where the threshold is actually met (stage 410). After the rollup (stage 410), or, in the situation where the percentage ownership of the backup owner is greater than a specific threshold (decision point 408), then the system then adjusts the total/percentage of ownership based on the result of these rollup(s), if applicable (stage 412). An example of an ownership rollup will now be provided in FIGS. 12 and 13.

FIG. 12 is a diagrammatic view 420 of an organizational structure that shows ownership percentages of a particular source code unit before performing an ownership rollup process described in FIG. 11. In the example shown, John has a 29% stake in the code, Joe has 5%, Peter has 15%, Jake has 24%, and Karen has 12%. Suppose the threshold is 30%. With a 30% threshold, neither the primary owner (John with 29%), nor the backup owner (Jake with 24%) meet the threshold. Thus, the ownership percentages are rolled up (aggregated) to the team leaders (or other role), as shown in the diagram 425 of FIG. 13. In this example of FIG. 13, after the rollup, Paul now has a 34% ownership stake, Peter has a 51% ownership stake, and Jane has a 15% ownership stake.

Turning now to FIG. 14, a process flow diagram 430 is shown that illustrates one implementation of the stages involved in using inclusion/exclusion lists as a heuristic in determining/adjusting source code ownership. An exclusion list can be supported that allows contributing users to be excluded specifically by various criteria, such as name, role, organization position, physical location, and so on. The system determines the totals/percentages of ownership for each contributing user/owner (stage 432), such as using the contribution heuristic in FIG. 4 and/or after further adjusting the totals with other heuristics described herein. If any of the owners meet the exclusion criteria (decision point 434), then the ownership totals/percentages are adjusted to account for the exclusion criteria (stage 436). As a few non-limiting examples, the totals can be re-balanced among the remaining contributing users, lines of code can be ignored for the excluded contributing user, or lines of code can be weighted less for the excluded contributing user. If none of the owners meet the exclusion criteria, then no further adjustments need to be made to the ownership totals based upon the inclusion/exclusion heuristic (stage 438).

As shown in FIG. 15, a process flow diagram 450 illustrates one implementation of the stages involved in using substitutions as a heuristic in determining/adjusting source code ownership. A substitution is where one person is substituted for another person. If Peter is assigned as a substitute for Jake, then the blocks of code that would be calculated as Jake would instead be assigned to Peter. The system determines the totals/percentages of ownership by owner (stage 452), such as using the contribution heuristic in FIG. 4 and/or after further adjusting the totals with other heuristics described herein. If any owners have a substitute specified (decision point 454), then the totals/percentages are adjusted to assign ownership to the specified substitute(s) (stage 456). If none of the owners have substitute specified (decision point 454), then no further adjustments need to be made to the ownership totals based upon the substitute heuristic (stage 458).

FIG. 16 is a process flow diagram 470 that illustrates one implementation of the stages involved in using code rollup as a heuristic in determining/adjusting source code ownership. Code is organized into a hierarchical set. A project may contain several directories, directories contain files, files contain functions, and functions contain lines of code. The system attempts to calculate the source code ownership for an entity (stage 472). The system determines that an owner for an entity at a lower layer cannot be calculated (stage 474), such as because of lack of information or because of significant organizational changes that causes all of the original owners to be unavailable. In such a scenario, ownership can be inferred from the entity higher up in the hierarchy (stage 476). An example will now be described to further illustrate this code rollup heuristic. Suppose the following code hierarchy exists:

Folder A:
File A—100 lines of code—Jake (primary—80%), Joe (backup—20%)
File B—500 lines of code—Joe (primary—65%), Jake (backup—35%)
File C—800 lines of code—John (primary—52%), Jake (backup—48%)
File D—200 lines of code—(unknown primary), (unknown backup)

The lines of code are calculated in the folder for all files of which ownership is known, which results in:
Jake=80+175+384=639 lines of code
Joe=20+325=350 lines of code
John=416 lines of code In this example, Jake has 45% of the folder, Joe has 25% of the folder, and John has 30% of the folder. Thus, by inference, Jake is now the primary owner of File D, and John is the backup owner of file D.

Turning now to FIG. 17, a process flow diagram 490 is shown that illustrates one implementation of the stages involved in providing a customization feature to allow a user to customize the heuristics used in determining source code ownership. A customization feature allows a contributing user or other user to specify what heuristic(s) to use in determining source code ownership (stage 492), such as one or more of the heuristics described herein (and initially shown on FIG. 1). Further customization can optionally be enabled for heuristic-specific evaluation criteria (stage 494), such as for setting thresholds, percentages, weights, and/or other criteria that one or more of the various heuristics may use in the process of determining/adjusting ownership of source code units (stage 496).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer storage memory having computer-executable instructions for causing a computer to perform steps comprising:
    receiving a request to identify at least one owner of a particular source code unit;
    calculating initial ownership totals for the particular source code unit based upon a code contribution heuristic that counts lines of the particular code unit that were added by each of a plurality of contributing users and further counts lines of the particular code unit that were modified by each of the plurality of contributing users;
    adjusting the initial ownership totals of the particular source code unit based upon other heuristics, wherein the other heuristics comprise program logic that is used to analyze the particular source code unit according to one or more rules, a line of the particular code unit comprising a comment counting less than a line of the particular code unit comprising a standard line of code, a code decay heuristic wherein the ownership totals are adjusted to account for code decay, and, an ownership rollup heuristic, wherein when a specific ownership total for a primary owner is less than a specific threshold, then respective ownership totals for all individual owners at a same organizational level as the primary owner are rolled up to a first common manager until the specific ownership total for the primary owner meets the specific threshold; and
    outputting the at least one owner of the particular source code unit, the at least one owner having a highest ranking total after adjusting the initial ownership totals.

2. The computer storage memory of claim 1, wherein the outputting step is operable to output a primary owner.

3. The computer storage memory of claim 2, wherein the outputting step is further operable to output a backup owner, the backup owner having a second highest ranking total after adjusting the initial ownership totals.

4. The computer storage memory of claim 1, wherein the initial ownership totals are calculated as a percentage.

5. The computer storage memory of claim 1, wherein user-defined customization settings are used as part of the calculating and adjusting steps.

6. A method for determining source code ownership comprising the steps of:
- using a computing device, totaling lines of code that were added in a particular source code unit for each contributing user;
- totaling lines of code that were modified in the particular source code unit for each contributing user;
- calculating ownership totals for each contributing user based upon the total added lines of code and the total modified lines of code;
- adjusting the ownership totals of the particular source code unit based upon heuristics, wherein the heuristics comprise a line of the particular code unit comprising a comment counting less than a line of the particular code unit comprising a standard line of code, a code decay heuristic wherein the ownership totals are adjusted to account for code decay, and, an ownership rollup heuristic, wherein when a specific ownership total for a primary owner is less than a specific threshold, then respective ownership totals for all individual owners at a same organizational level as the primary owner are rolled up to a first common manager until the specific ownership total for the primary owner meets the specific threshold; and
- identifying one or more owners of the particular source code unit based upon a ranking of the ownership totals.

7. The method of claim 6, further comprising the steps of:
- further adjusting the ownership totals based upon program logic that is used to analyze the particular source code unit according to one or more rules.

8. The method of claim 7, wherein a customization feature allows one or more settings for the at least one other heuristic to be specified by a user for use in adjusting the ownership totals.

9. A method for determining primary and backup owners of source code comprising the steps of:
- using a computing device, totaling lines of code that were added in a particular source code unit for each contributing user;
- totaling lines of code that were modified in the particular source code unit for each contributing user;
- calculating ownership percentages for each contributing user based upon the total added lines of code and the total modified lines of code;
- adjusting the ownership percentages of the particular source code unit based upon heuristics, wherein the heuristics comprise a line of the particular code unit comprising a comment counting less than a line of the particular code unit comprising a standard line of code, a code decay heuristic wherein the ownership percentages are adjusted to account for code decay, and, an ownership rollup heuristic, wherein when a specific ownership total for a primary owner is less than a specific threshold, then respective ownership totals for all individual owners at a same organizational level as the primary owner are rolled up to a first common manager until the specific ownership total for the primary owner meets the specific threshold;
- identifying a primary owner of the particular source code unit by selecting a highest ranking contributing user from the ownership percentages; and
- identifying a backup owner of the particular source code unit by selecting a second highest ranking contributing user from the ownership percentages.

10. The method of claim 9, further comprising the step of:
- excluding lines of source code that were deleted in the particular source code unit by each contributing user.

11. The method of claim 9, further comprising the step of:
- prior to identifying the primary owner and the secondary owner, adjusting the ownership percentages based upon at least one other heuristic.

\* \* \* \* \*